US011048536B2

(12) United States Patent
Radunovic et al.

(10) Patent No.: US 11,048,536 B2
(45) Date of Patent: Jun. 29, 2021

(54) HIGH AVAILABILITY CLOUD SERVICE PROVISION

(71) Applicant: Microsoft Technology Licensing, LLC, Redmond, WA (US)

(72) Inventors: Bozidar Radunovic, Cambridge (GB); Yongguang Zhang, Medina, WA (US); Zhaowei Tan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 15/842,576

(22) Filed: Dec. 14, 2017

(65) Prior Publication Data

US 2019/0163514 A1 May 30, 2019

Related U.S. Application Data

(60) Provisional application No. 62/591,551, filed on Nov. 28, 2017.

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5083* (2013.01); *H04L 67/1008* (2013.01);
(Continued)

(58) Field of Classification Search
None
See application file for complete search history.

(56) References Cited

U.S. PATENT DOCUMENTS 7,236,476 B2 * 6/2007 Banerjee ........... H04W 36/0011
370/331
9,032,240 B2   5/2015 Reddy Sirigiri et al.
(Continued)

OTHER PUBLICATIONS

Kuribayashi, Shin-ichi. "Improving quality of service and reducing power consumption with WAN accelerator in cloud computing environments." Feb. 8, 2013. arXiv preprint arXiv:1302.1921. (Year: 2013).*

(Continued)

*Primary Examiner* — Lewis A Bullock, Jr.
*Assistant Examiner* — Gilles R Kepnang
(74) *Attorney, Agent, or Firm* — Schwegman Lundberg & Woessner, P.A.

(57) ABSTRACT

Systems and methods for high availability cloud service provision are disclosed. A server receives, from a remote device, a request to access a specified service, the specified service being associated with a plurality of virtual machines, each of the plurality of virtual machines storing shared states associated with the specified service. The server provides, to the remote device in response to the request, a connection to a first virtual machine of the plurality of virtual machines and identifiers of other ones of the plurality of virtual machines. The server determines to end a data connection the remote device and the first virtual machine while continuing to provide the specified service to the remote device. The server provides, to the remote device in response to determining to disconnect the remote device from the first virtual machine, a connection to a second virtual machine of the plurality of virtual machines.

20 Claims, 5 Drawing Sheets

(51) Int. Cl.
*H04L 29/08* (2006.01)
*H04L 29/06* (2006.01)
*H04W 80/04* (2009.01)
*H04W 36/00* (2009.01)

(52) U.S. Cl.
CPC ........ *H04L 67/1034* (2013.01); *H04L 67/145* (2013.01); *G06F 9/505* (2013.01); *G06F 2009/4557* (2013.01); *G06F 2009/45562* (2013.01); *G06F 2009/45595* (2013.01); *G06F 2209/505* (2013.01); *H04L 67/10* (2013.01); *H04L 67/148* (2013.01); *H04L 69/163* (2013.01); *H04W 36/0011* (2013.01); *H04W 80/04* (2013.01)

(56) References Cited

U.S. PATENT DOCUMENTS

| | | | | |
|---|---|---|---|---|
| 10,644,952 | B2* | 5/2020 | Xue | H04L 41/0668 |
| 2005/0198303 | A1* | 9/2005 | Knauerhase | G06F 9/5055 |
| | | | | 709/227 |
| 2006/0164974 | A1 | 7/2006 | Ramalho et al. | |
| 2007/0058587 | A1* | 3/2007 | Han | H04W 36/0011 |
| | | | | 370/331 |
| 2007/0086386 | A1* | 4/2007 | Suh | H04W 8/26 |
| | | | | 370/331 |
| 2008/0028081 | A1* | 1/2008 | Bruss | H04L 63/08 |
| | | | | 709/228 |
| 2009/0201886 | A1* | 8/2009 | Lee | H04W 28/0231 |
| | | | | 370/335 |
| 2010/0030839 | A1* | 2/2010 | Ceragioli | H04L 67/1036 |
| | | | | 709/201 |
| 2010/0218034 | A1* | 8/2010 | Sirigiri | G06F 11/2048 |
| | | | | 714/4.12 |
| 2011/0185065 | A1* | 7/2011 | Stanisic | H04L 67/1002 |
| | | | | 709/226 |
| 2011/0239216 | A1* | 9/2011 | Miyajima | G06F 9/455 |
| | | | | 718/1 |
| 2011/0246992 | A1* | 10/2011 | Kern | G06F 9/5083 |
| | | | | 718/100 |
| 2015/0178107 | A1* | 6/2015 | Gummaraju | G06F 9/45558 |
| | | | | 718/1 |
| 2015/0293773 | A1* | 10/2015 | Cai | H04L 67/28 |
| | | | | 718/1 |
| 2016/0072713 | A1* | 3/2016 | Mhatre | H04L 67/42 |
| | | | | 709/235 |
| 2016/0127509 | A1* | 5/2016 | Uriel | H04L 61/103 |
| | | | | 709/203 |
| 2016/0170792 | A1* | 6/2016 | Kato | G06F 9/45558 |
| | | | | 718/1 |
| 2016/0234059 | A1* | 8/2016 | Gu | H04L 45/021 |
| 2016/0246638 | A1* | 8/2016 | Rinta-Aho | G06F 9/5055 |
| 2016/0335111 | A1* | 11/2016 | Bruun | G06F 9/45558 |
| 2017/0034198 | A1* | 2/2017 | Powers | G06F 21/552 |
| 2017/0264525 | A1* | 9/2017 | Falk | G06F 9/455 |
| 2018/0006896 | A1* | 1/2018 | Macnamara | G06F 3/0617 |
| 2018/0013586 | A1* | 1/2018 | Wang | H04L 41/0886 |
| 2018/0084084 | A1* | 3/2018 | Sharma | H04L 41/082 |
| 2018/0095855 | A1* | 4/2018 | Sanakkayala | G06F 9/45558 |
| 2018/0107502 | A1* | 4/2018 | Shang | G06F 11/07 |
| 2018/0205786 | A1* | 7/2018 | Dong | H04L 67/1002 |
| 2018/0365044 | A1* | 12/2018 | Movsisyan | H04L 41/0816 |
| 2019/0394658 | A1* | 12/2019 | Baillargeon | H04W 56/001 |
| 2020/0287821 | A1* | 9/2020 | Power | H04L 67/327 |

OTHER PUBLICATIONS

"International Search Report and Written Opinion Issued in PCT Application No. PCT/US2018/062150", dated Feb. 21, 2019, 11 pages.

* cited by examiner

HIGH AVAILABILITY CLOUD SERVICE PROVISION

PRIORITY CLAIM

This application claims priority to U.S. Provisional Patent Application No. 62/591,551, filed on Nov. 28, 2017, and titled "HIGH AVAILABILITY CLOUD SERVICE PROVISION," the entire disclosure of which is incorporated herein by reference.

BACKGROUND

In some cases, a cloud service is provided by storing information in one or more servers or data repositories. However, problems can occur if the servers or data repositories are offline or have high loads. Techniques for high availability cloud service provision are desirable.

BRIEF DESCRIPTION OF THE DRAWINGS

Some embodiments of the technology are illustrated, by way of example and not limitation, in the figures of the accompanying drawings.

SUMMARY

Figure 1:
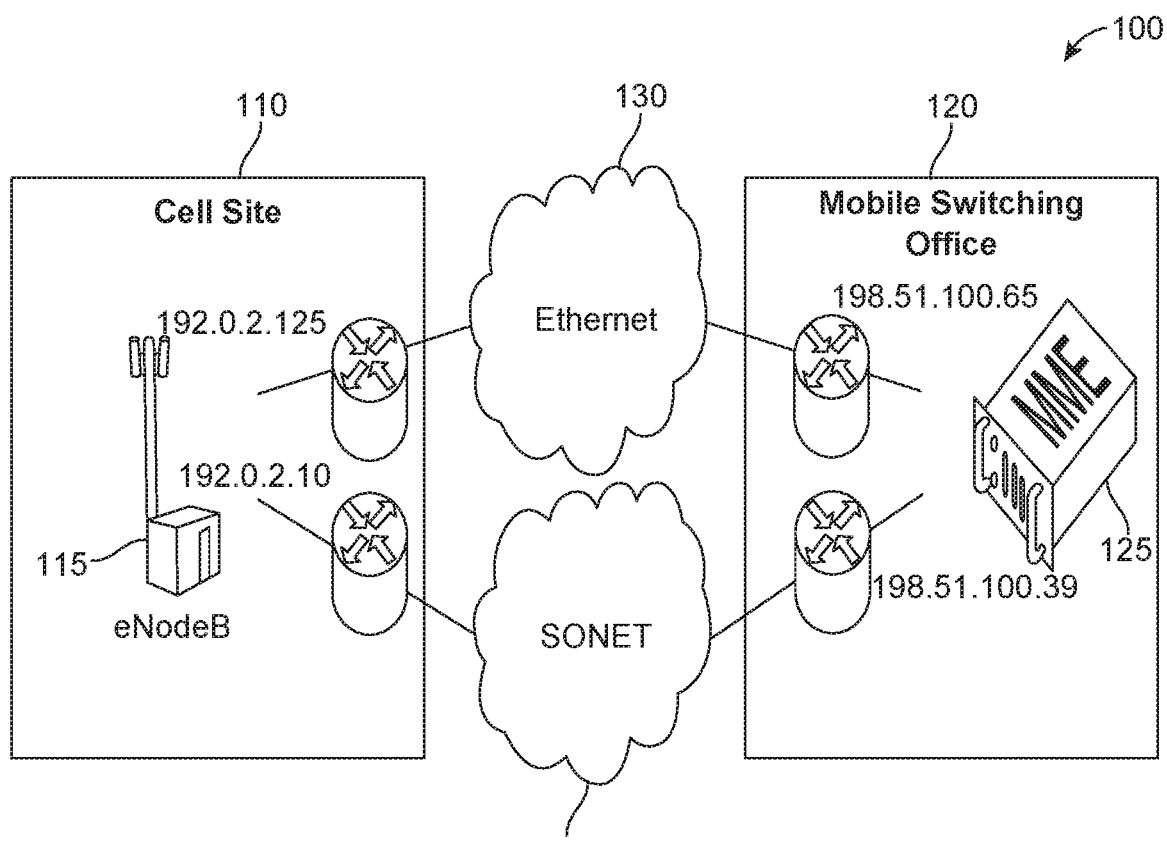
FIG. 1 illustrates an example cellular system, in accordance with some embodiments.

The present disclosure generally relates to machines configured to provide machine comprehension, including computerized variants of such special-purpose machines and improvements to such variants, and to the technologies by which such special-purpose machines become improved compared to other special-purpose machines that provide technology for machine comprehension. In particular, the present disclosure addresses systems and methods for high availability cloud service provision.

According to some aspects of the technology described herein, a system includes processing circuitry; and a memory storing instructions which, when executed by the processing circuitry, cause the processing circuitry to perform operations comprising: receiving, from a remote device, a request to access a specified service, the specified service being associated with a plurality of virtual machines, each of the plurality of virtual machines storing a shared state associated with the specified service; providing, to the remote device in response to the request, a connection to a first virtual machine of the plurality of virtual machines and identifiers of other ones of the plurality of virtual machines; determining to disconnect the remote device from the first virtual machine while continuing to provide the specified service to the remote device; and providing, to the remote device in response to determining to disconnect the remote device from the first virtual machine, a connection to a second virtual machine of the plurality of virtual machines.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, in some cases, a cloud service is provided by storing information in one or more servers or data repositories. However, problems can occur if the servers or data repositories are offline or have high loads. Techniques for high availability cloud service provision are desirable. Some aspects of the technology described herein are directed to techniques for providing high scalability, high availability, and load balancing features for network functions in the cloud.

Some aspects of the technology described herein relate to a design and implementation of high-availability, high-scalability, and load balancing techniques for Stream Control Transmission Protocol (SCTP) based network functions in a hyper-scale cloud environment. SCTP is used in network infrastructure where edge equipment communicates with core network components. In some cases, the core network functions may be moved to the cloud. Software mechanisms in the cloud to provide high availability, high scalability, and load balancing features may be desirable. Some aspects of the technology described herein leverage SCTP to build a set of software to achieve these features. In some cases, SCTP is also used for communication between two components in a cloud or data center, for example, to virtualized network functions. In some examples, an edge device, such as a wireless access point, communicates with the cloud.

Network Function Virtualization (NFV) relates to techniques to replace the expensive, inflexible, dedicated hardware boxes with software running on large-scale commodity servers in a cloud. NFV may be deployed in some cellular (or other network) infrastructures.

One challenge of NFV is to provide performance as good as or better than the traditional hardware. One metric of performance is availability, where high availability ensures low system outage and better service continuity. For example, some cellular network operators expect five nines (99.999%) availability. In the control plane of the cellular core network, a tiny outage may cause a large number of devices to lose connection for an hour or more.

In some cases, specially-manufactured hardware and redundant equipment are used to achieve such high availability. However, this is an expensive solution and it does not apply to the cloud environment, where the cloud service is usually classified as having three nines (99.9%) availability. The cloud service may fail or be disrupted, for example, due to hardware failures, internal network outages, or high-level failures (e.g., power outages).

Example Implementations

FIG. 1 illustrates an example cellular system 100, in accordance with some embodiments. As shown, the cellular system 100 includes a cell site 110 and a mobile switching office 120. The cell site 110 includes an evolved NodeB (eNodeB) 115. The mobile switching office 120 includes a Mobility Management Entity (MME) 125. The eNodeB 115 and the MME 125 are connected via Ethernet 130 and via Synchronous Optical Networking (SONET) 140. The eNodeB 115 has an Internet Protocol (IP) address for Ethernet 130 and an IP address for SONET 140. The MME 125, similarly, has an IP address for Ethernet 130 and an IP address for SONET 140.

In some cases, network equipment uses SCTP to communicate with core network components. SCTP uses a multi-homing mechanism to implement redundant connection paths to overcome equipment or network failures. However, in a cloud environment, multi-homing cannot handle the situation where the entire virtual machine (VM) fails, which is highly likely to be the failure model in the cloud computing environment. For example, in FIG. 1, SCTP can handle an Ethernet 130 failure. However, if the MME 125 fails, regardless of how many Network Interface Cards (NICs) the MME 125 possesses, the communication between the cell site 110 and the mobile switching office 120 will fail.

Some aspects of the technology described herein deploy a shared memory among a cluster to appear as a single box with many NICs. To this end, the opposite endpoint may use SCTP's multi-homing feature to provide a backup for the connection. Some aspects implement the load balancing inside the cluster, which utilizes the SCTP built in feature to notify the other side of the communication that load balancing is taking place. Some aspects modify the communication socket and provide an interface for the application level to delete data in the transport layer after it finishes processing. This avoids the problematic outcome when a VM fails after it acknowledges (ACKs) a packet. (I.e., The client device sends additional packets to the VM, which is then unable to process the additional packets due to its failure.)

According to some implementations of the technology described herein, a client device (e.g., a user equipment (UE) in a cellular network) connects to a server to set up a SCTP connection. In a cellular network, the client device connects to the server via an eNodeB. FIGS. 2A-2D illustrate some embodiments of the technology described herein as being implemented in a cellular network. However, it should be noted that the technology described herein is not limited to cellular networks and may be implemented in other networks also.

Figure 2A:
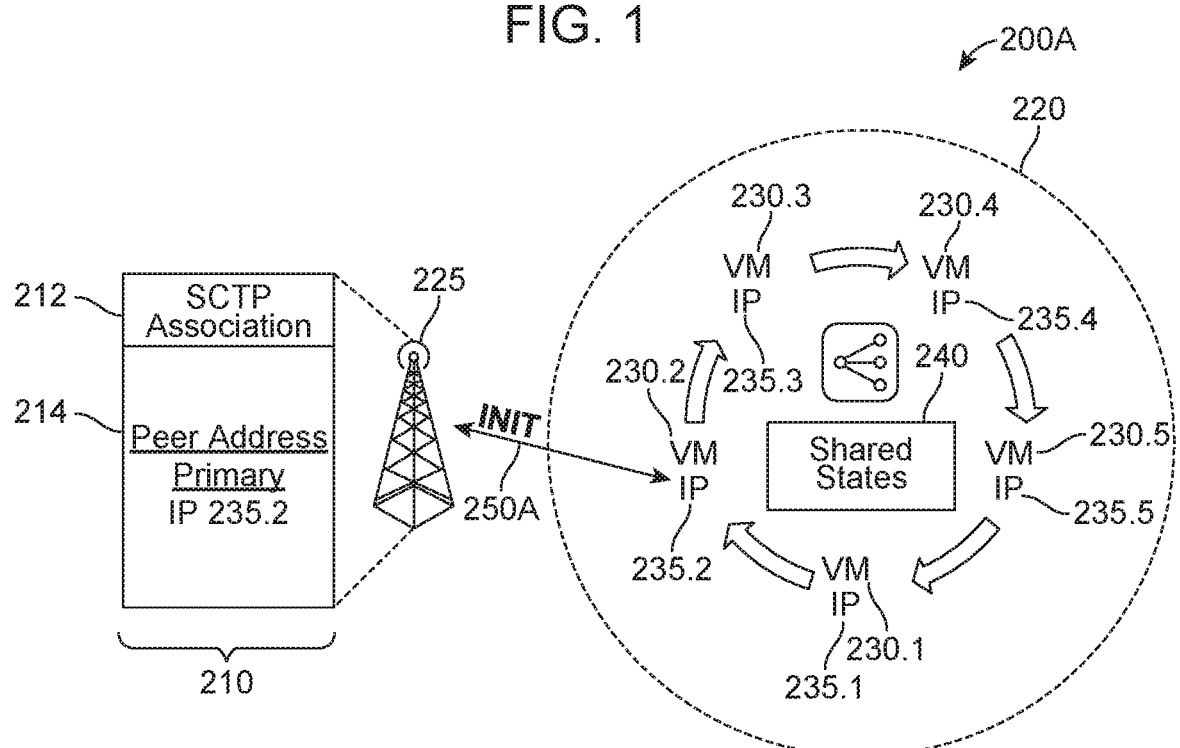
FIG. 2A illustrates an example cloud service provisioning system in which a client device opens an initial connection to a first Internet Protocol (IP) address, in accordance with some embodiments.

FIG. 2A illustrates an example cloud service provisioning system 200A in which a client device 210 opens an initial connection (INIT) 250A to a first IP address, in accordance with some embodiments. As shown, the system 200A includes the client device 210, a cloud server 220, a node 225. The cloud server 220 includes multiple VMs 230.1-5.

Each VM 230.$k$ (where k is a number between 1 and 5) is associated with an IP address 235.$k$. All of the VMs 230.1-5 store shared states 240. The shared states 240 include shared data, instructions, and states of software programs. It should be noted that, while FIGS. 2A-2D illustrate systems with five VMs 230.1-5, the technology described herein may be implemented with any number of VMs, not necessarily five.

As shown in FIG. 2A, the client device 210A opens the initial connection 250A to VM 230.2 via the node 225. The node 225 may include one or more of an eNodeB, a gNB (fifth generation NodeB), an AP, and the like. The client device 210 stores a SCTP association 212 and an address block 214. The SCTP association is a generalization of a Transmission Control Protocol (TCP) connection. However, a TCP connection is one-to-one between two network interfaces, one on a server and the other on a client. In contrast, an SCTP association is many-to-many to the degree that: (i) multiple network interfaces on the cloud server may be associated with multiple interfaces on the client device 210, and (ii) the SCTP association 212 may carry multiple logical streams. The address block 214 for the SCTP association 212 stores the peer address primary—IP 235.2—for the initial connection 250A to VM 230.2. The peer address primary is the primary IP address with which the client device 210 communicates in the SCTP association 212. The client device 210 communicates with VM 230.2 to access the shared states 240. In addition, while the cloud server 220 is described as being a single server, the cloud server may be implemented as one or more virtual machines, one or more physical machines, and/or a server farm including multiple servers.

In some implementations, the client device 210 may initially connect to more than one initial IP address (e.g., in cases of extreme reliability). The client device 210 may get the more than one initial IP address from a Domain Name Server (DNS) query. Alternatively, the more than one initial IP address may be statically configured. The server 220 may then add many more addresses and dynamically change the existing IP addresses without ever dropping the client device 210.

Figure 2B:
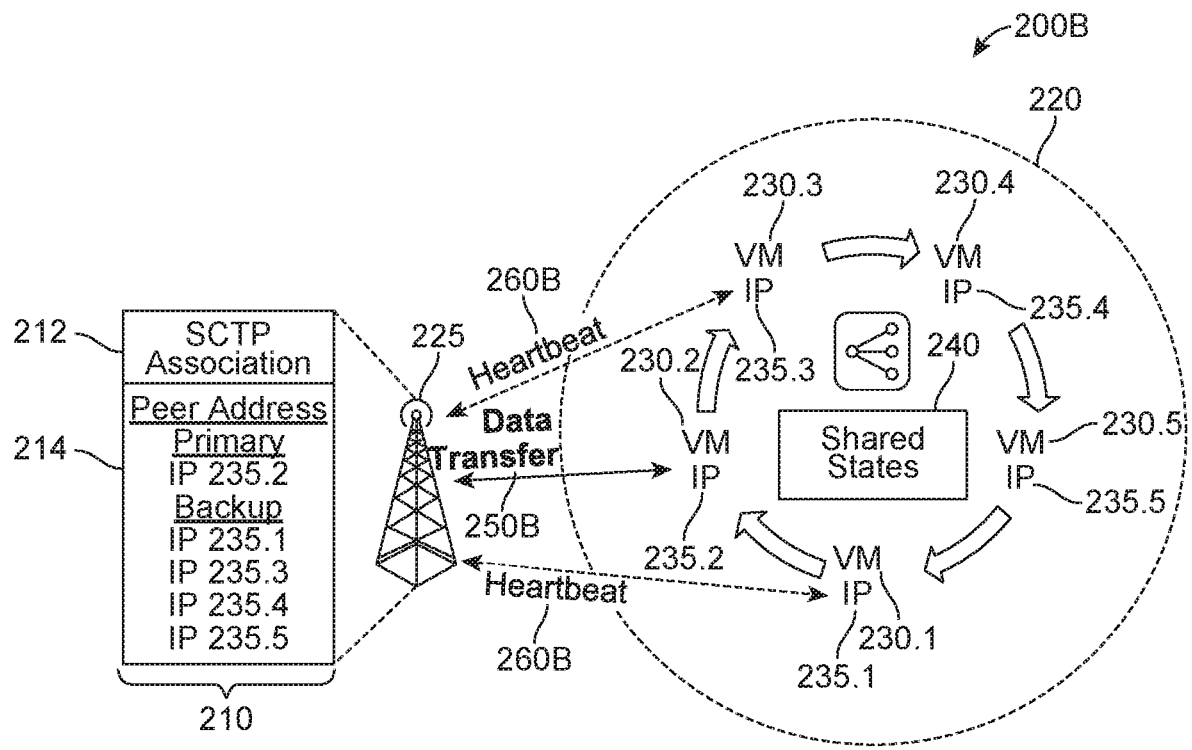
FIG. 2B illustrates an example cloud service provisioning system in which a cloud server instructs the client device to establish connections with additional IP addresses, in accordance with some embodiments.

FIG. 2B illustrates an example cloud service provisioning system 200B in which the cloud server 220 instructs the client device 210 to establish connections with additional IP addresses 235.1, 235.3, 235.4 and 235.5, in accordance with some embodiments. The configuration shown in FIG. 2B may occur after that of FIG. 2A. The cloud server 220 provides all the IP addresses 235.1-5 of all the VMs 230.1-5 in the cluster connected by the shared states 240. From the perspective of the client 210, the cloud server 220 appears as a single machine with multiple available IP addresses. In some cases, no modifications to the client device are needed to process the instruction from the cloud server 220. Upon processing the instruction from the cloud server 220, the client device 210 stores, in the address block 214, the peer address primary—IP address 235.2—and backup addresses—IP addresses 235.1, 235.3, 235.4 and 235.5. As shown in FIG. 2B, the client device 210 engages in data transfer 250B with the VM 230.2 and receives heartbeats 260B from the VMs 230.1 and 230.3 (and also VMs 230.4 and 230.5—the heartbeats from VMs 230.4 and 230.5 are not illustrated to simplify the figure).

Figure 2C:
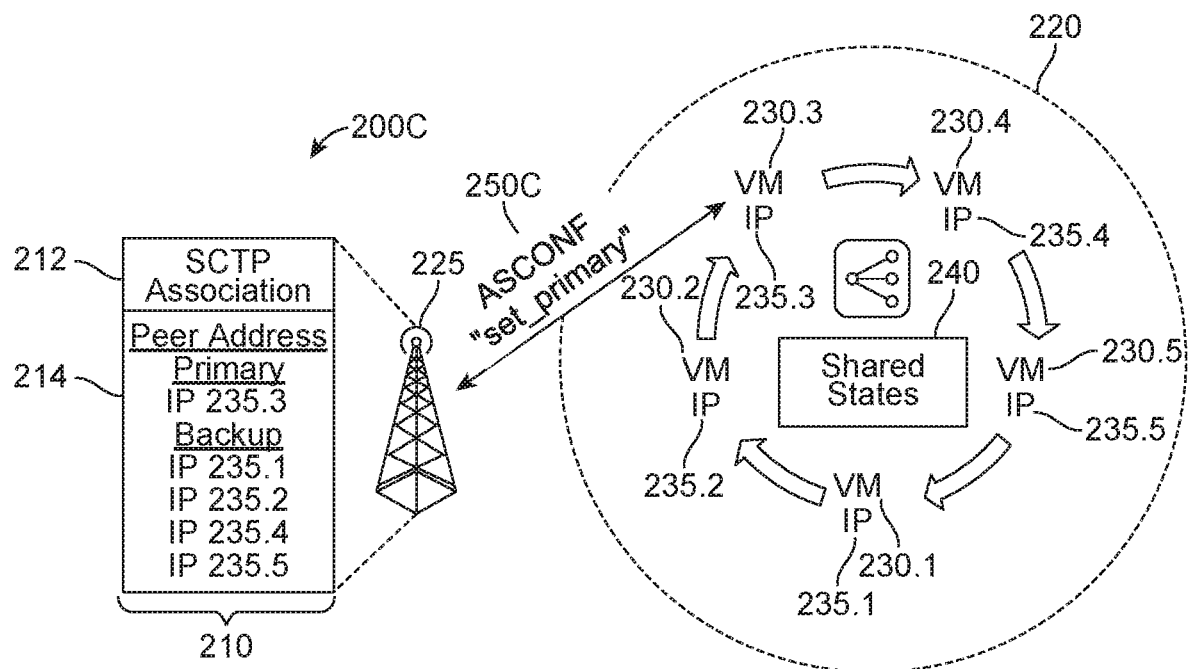
FIG. 2C illustrates an example cloud service provisioning system in which the cloud server performs load balancing, in accordance with some embodiments.

FIG. 2C illustrates an example cloud service provisioning system 200C in which the cloud server 220 performs load balancing, in accordance with some embodiments. The configuration shown in FIG. 2C may occur after that of FIG. 2B. In load balancing, the cloud server 220 may decide to service the client device 210 via VM 230.3 instead of VM

230.2. This may occur, for example, in response to a high load at the VM 230.2 or a low load at the VM 230.3. To do this, the VM 230.3 sends an Address Configuration Change Chunk (ASCONF) "set_primary" command 250C to the client device 210 via the node 225. The ASCONF "set_primary" command 250C identifies the IP address 235.3 of the VM 230.3. In response, the client device 210, in its address block 214, stores IP address 235.3 instead of IP address 235.2 as the peer address primary. The client device 210, in its address block 214, stores IP address 235.2 instead of IP address 235.3 as a backup address. The client device 210 then communicates with the VM 230.3 associated with the IP address 235.3 in the peer address primary.

Figure 2D:
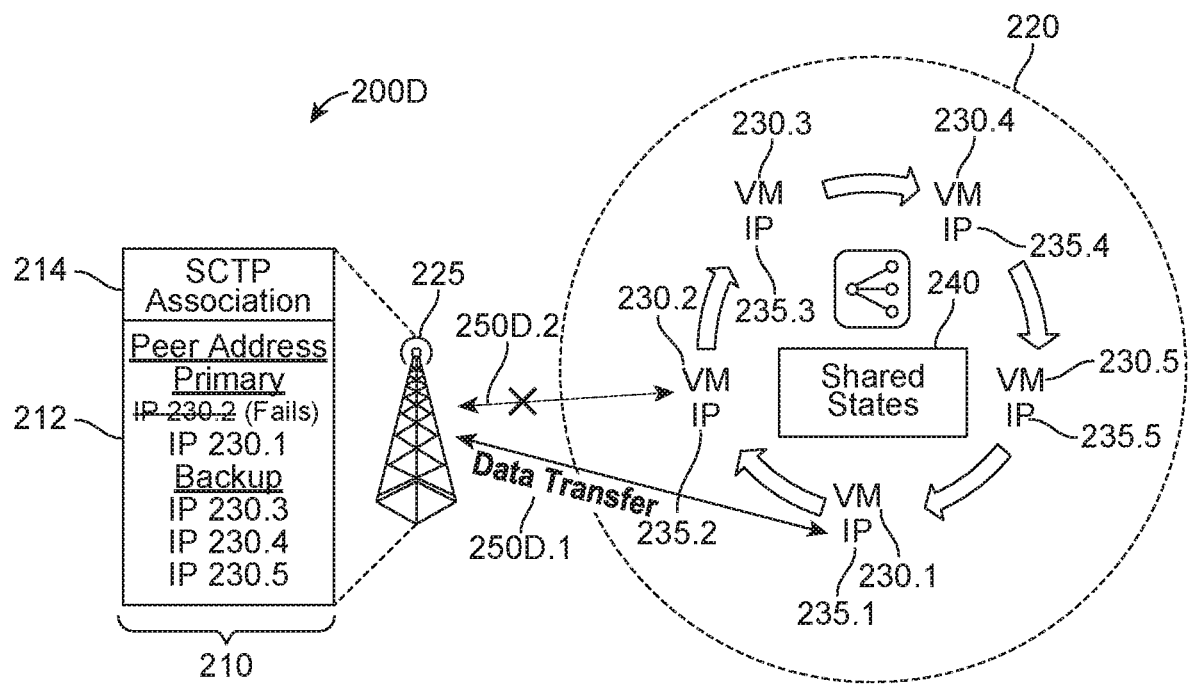
FIG. 2D illustrates an example cloud service provisioning system in which the a virtual machine associated with an IP address stored by the client device in peer address primary fails, in accordance with some embodiments.

FIG. 2D illustrates an example cloud service provisioning system 200D in which the virtual machine 230.2 associated with the IP address 235.2 stored by the client device 210 in peer address primary fails, in accordance with some embodiments. The configuration shown in FIG. 2D may occur after that of FIG. 2B.

When the VM 230.2 with which the client device 210 was communicating fails, the client device 210 automatically uses another IP address stored in the backup addresses of the address block 214. As shown, upon the failure of the VM 230.2, the client device 210 communicates with the IP address 235.1, corresponding to the VM 230.1. Data transfer 250D.1 is initiated with the VM 230.1, while data transfer 250D.2 with the VM 230.2 is stopped. In response to the failure, in the peer address primary of the address block 214 of the client device 210, IP 230.2 is removed and IP 230.1 is added. The backup in the address block 214 lists IP 230.3, IP 230.4, and IP 230.5. IP 230.1 is removed from the backup as IP 230.1 is now the peer address primary.

The VM switch from VM 230.2 to VM 230.1 happens after a timeout. The length of the timeout may be configured based on the requirements of a cellular (or other network) operator. In some cases, the VM switch occurs entirely at the server 220, without any modifications at the client device 210. The new VM 230.1 takes over from the original VM 230.2 by accessing the shared states 240, which were created by the operation of the original VM 230.2 prior to its failure.

For secure socket, the transport layer exposes another Application Programming Interface (API)—"recvcommit"— to the application (APP) level. Therefore, the APP level can commit the changes after the states in APP level are changed, and then the data in shared states 240 is deleted. By doing this, the data might not be discarded after the APP level state has been modified, ensuring consistency.

An application sitting on top of SCTP may also be reliable. In particular, an application may call recvmsg( ) and then immediately crash. Even if the application restarts immediately, the aforementioned message may be lost because it was taken from the reliable SCTP queue but was not stored to any other reliable queue. The recvcommit API addresses this issue. The reliable SCTP keeps the last recvmsg in the queue until recvcommit is called with the identifier (ID) of that last message. After recvcommit is called, the message is removed from the reliable SCTP queue. This allows the application to commit the aforementioned message to its own reliable storage and, after the application stores the message, the message is removed from SCTP via recvcommit.

Figure 3:
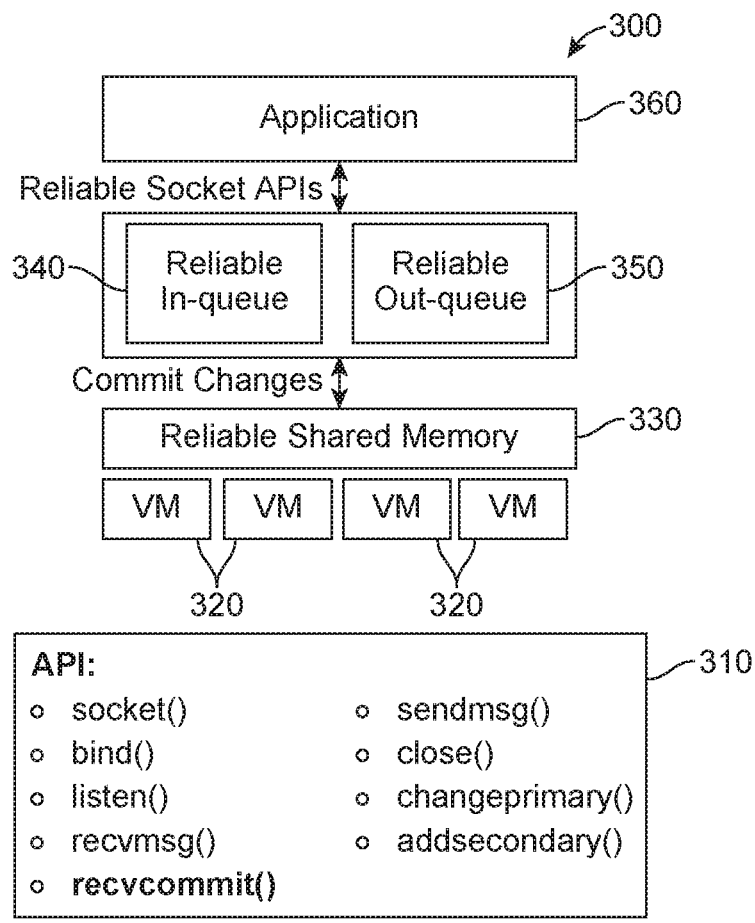
FIG. 3 illustrates an example data architecture, in accordance with some embodiments.

FIG. 3 illustrates an example data architecture 300, in accordance with some embodiments. As shown, the data architecture 300 includes APIs 310 that are used by the multiple VMs 320 (e.g., corresponding to the VMs 230). The APIs 310 include recvcommit( ) and standard SCTP APIs: socket( ), bind ( ), listen( ), recvmsg( ), sendmsg( ), close ( ), changePrimary( ), and addSecondary( ). First, the server 220 opens a socket with socket( ) as an intention to communicate, and sets parameters. Then, with bind( ), the server 220 binds the socket to a specific IP address (if the server has multiple network interface cards), a specific protocol and a specific port. Then the server 220 uses listen( ) to get new connections. Once new connection is open, the server 220 may use recvmsg( ) and sendmsg( ) to communicate to the other end point. The close( ) API closes the connection. The changeprimary( ) API sends an ASCONF message to change the primary. The addsecondary( ) API adds another secondary IP address. The VMs 320 communicate with a reliable shared memory 330 (e.g., corresponding to shared states 240). The reliable shared memory 330 commits changes to the reliable in-queue 340 and the reliable out-queue 350. The reliable in-queue 340 and the reliable out-queue 350 use reliable socket APIs to communicate with the application layer 360. Reliable in-queue 340 and reliable out-queue 350 provide the interface to the application 360. Recvcommit( ) operates with the reliable in-queue 340 and removes a message from the queue when the application 360 requests so by calling the function.

Some implementations provide high availability using VMs 230. Some implementations provide fast, reliable, and scalable shared memory with negligible overhead. In some implementations, the multiple path overhead is negligible at the client device 210. In some implementations, there is no need for a front end to distribute the load, as the client device 210 selects the endpoint. In some implementations, there is fast failover enabled by native SCTP features. If one path fails, the endpoint tries another one after a timeout. Some implementations provide load balancing. Some implementations are backward compatible, as the client device 210 might not need to be modified. In some implementations, the socket is reliable, and the shared state 240 is consistent after a failure.

Some aspects propose a software architecture and design to improve the availability and scalability of the cellular core network control plane. Some aspects are directed to using SCTP's multi-homing mechanism to achieve high scalability, high availability, and load balancing.

In some embodiments, Remote Direct Memory Access (RDMA) is used for fast, reliable and scalable shared memory. However, other networking protocols may also be used. In some cases, the client device 210 may select an endpoint by issuing a changeprimary( ) command. This may be useful in cases where the client device is better able to determine congestion on the server side. In some cases, the SCTP is backward compatible so that the client device 210 does not need to be aware of the changes. In other words, the sequence of messages the client device sees on TCP would be the same as if the entire implementation existed on a single server with multiple NICs. In some cases, the shared state 240 in shared memory is replicated across (2n+1) servers, and a distributed system may tolerate failures in n servers without compromising the shared state 240. If a server restarts, the restarting server obtains the shared state 240 from another server and announces its IP address as a secondary IP address. The restarting server may later become the primary IP address in response to a request.

Figure 4:
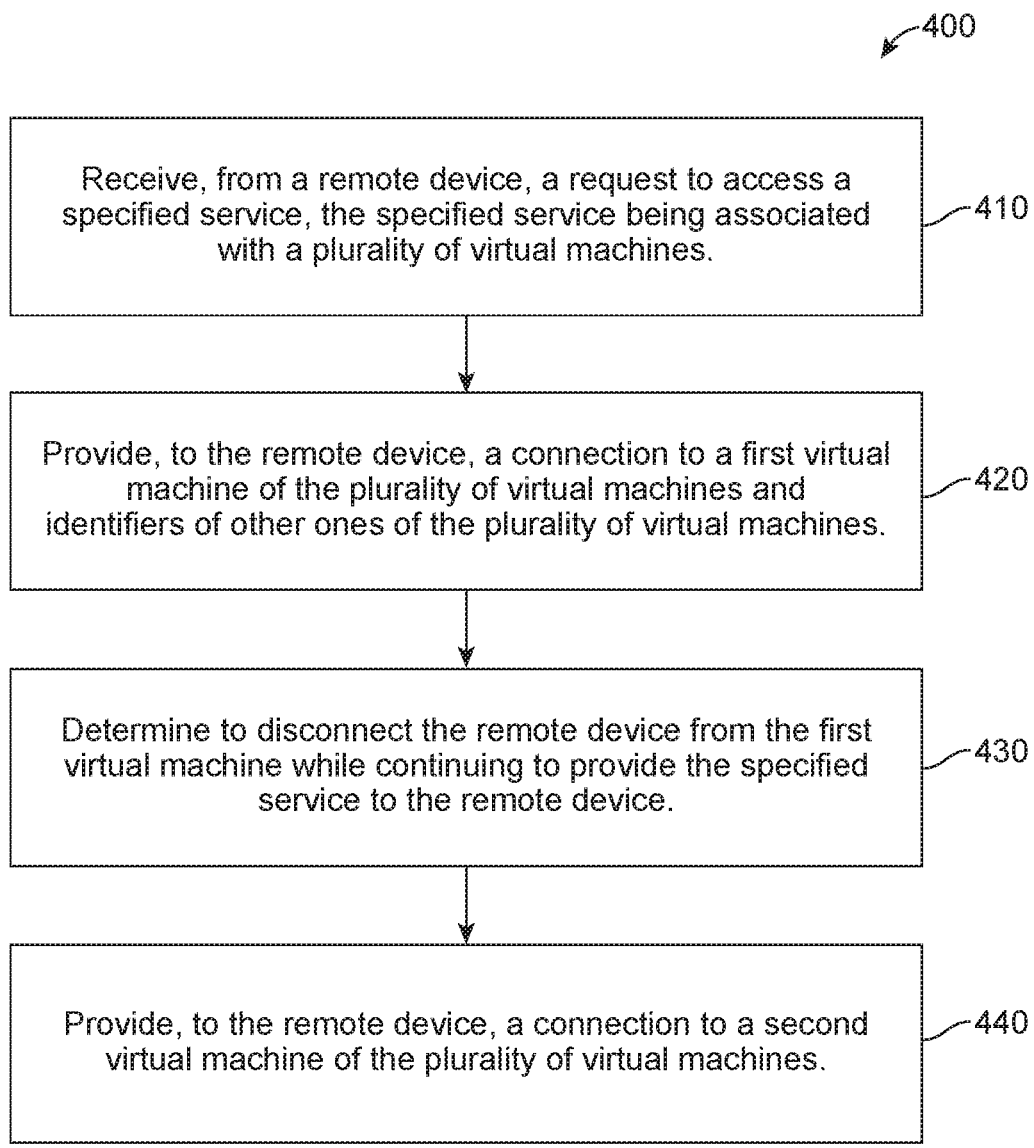
FIG. 4 is a flow chart of an example method for providing a high availability cloud service, in accordance with some embodiments.

FIG. 4 is a flow chart of an example method 400 for providing a high availability cloud service, in accordance with some embodiments.

At operation 410, a server (e.g., server 220) receives, from a remote device (e.g., client device 210), a request to access a specified service. The specified service is associated with a plurality of virtual machines (e.g., virtual machines 230).

Each of the plurality of virtual machines stores shared states (e.g., shared states 240) associated with the specified service.

At operation 420, the server provides, to the remote device in response to the request, a connection (e.g., an SCTP connection) to a first virtual machine (e.g., virtual machine 230.2) of the plurality of virtual machines and identifiers (e.g., IP addresses) of other ones of the plurality of virtual machines. In some embodiments, the remote device may open initial connections with multiple virtual machines, rather than a single first virtual machine. In some cases, the identifiers of the other ones of the plurality of virtual machines cause the remote device to receive heartbeats (e.g., heartbeats 260B) from the other ones of the plurality of virtual machines. If SCTP is used, the initial request (of operation 410) to access the specified service includes the IP address of the first virtual machine. In other words, the remote device may select and identify the first virtual machine. However, as described herein, the remote device may later communicate with any other virtual machine associated with the service in place of the first virtual machine.

At operation 430, the server determines to disconnect the remote device from the first virtual machine while continuing to provide the specified service to the remote device. In some cases, the server determines to disconnect the remote device from the first virtual machine in response to a load balancing that includes the first virtual machine. In some cases, the server determines to disconnect the remote device from the first virtual machine in response to a failure of the first virtual machine.

At operation 440, the server provides, to the remote device in response to determining to disconnect the remote device from the first virtual machine, a connection to a second virtual machine of the plurality of virtual machines. In some cases, the server provides the connection to the second virtual machine by providing an ASCONF instructing the remote device to disconnect from the first virtual machine and to connect to the second virtual machine.

Numbered Examples

Certain embodiments are described herein as numbered examples 1, 2, 3, etc. These numbered examples are provided as examples only and do not limit the subject technology.

Example 1 is a system comprising: processing circuitry, and a memory storing instructions which, when executed by the processing circuitry, cause the processing circuitry to perform operations comprising: receiving, from a remote device, a request to access a specified service, the specified service being associated with a plurality of virtual machines, each of the plurality of virtual machines storing shared states associated with the specified service; providing, to the remote device in response to the request, a connection to a first virtual machine of the plurality of virtual machines and identifiers of other ones of the plurality of virtual machines, the identifiers being provided for storage in conjunction with a Stream Control Transmission Protocol (SCTP) association; determining to end a data connection between the remote device and the first virtual machine while continuing to provide the specified service to the remote device via a second virtual machine; and providing, to the remote device in response to determining to end the data connection, a connection to the second virtual machine of the plurality of virtual machines.

In Example 2, the subject matter of Example 1 includes, wherein determining to end the data connection is in response to a load balancing that includes the first virtual machine.

In Example 3, the subject matter of Examples 1-2 includes, wherein determining to end the data connection is in response to a failure of the first virtual machine.

In Example 4, the subject matter of Examples 1-3 includes, wherein the identifiers of the other ones of the plurality of virtual machines cause the remote device to receive heartbeats from the other ones of the plurality of virtual machines.

In Example 5, the subject matter of Examples 1-4 includes, wherein the connection to the first virtual machine comprises a Stream Control Transmission Protocol (SCTP) connection.

In Example 6, the subject matter of Examples 1-5 includes, wherein providing the connection to the second virtual machine comprises: providing an Address Configuration Change Chunk (ASCONF) instructing the remote device to end the data connection and to connect to the second virtual machine.

In Example 7, the subject matter of Examples 1-6 includes, wherein the request to access the specified service comprises an address of the first virtual machine.

In Example 8, the subject matter of Examples 1-7 includes, wherein the remote device comprises a client device.

Example 9 is a non-transitory machine-readable medium storing instructions which, when executed by processing circuitry of one or more machines, cause the processing circuitry to perform operations comprising: receiving, from a remote device, a request to access a specified service, the specified service being associated with a plurality of virtual machines, each of the plurality of virtual machines storing shared states associated with the specified service; providing, to the remote device in response to the request, a connection to a first virtual machine of the plurality of virtual machines and identifiers of other ones of the plurality of virtual machines, the identifiers being provided for storage in conjunction with a Stream Control Transmission Protocol (SCTP) association; determining to end a data connection between the remote device and the first virtual machine while continuing to provide the specified service to the remote device via a second virtual machine; and providing, to the remote device in response to determining to end the data connection the remote device from the first virtual machine, a connection to the second virtual machine of the plurality of virtual machines.

In Example 10, the subject matter of Example 9 includes, wherein determining to end the data connection is in response to a load balancing that includes the first virtual machine.

In Example 11, the subject matter of Examples 9-10 includes, wherein determining to end the data connection is in response to a failure of the first virtual machine.

In Example 12, the subject matter of Examples 9-11 includes, wherein the identifiers of the other ones of the plurality of virtual machines cause the remote device to receive heartbeats from the other ones of the plurality of virtual machines.

In Example 13, the subject matter of Examples 9-12 includes, wherein the connection to the first virtual machine comprises a Stream Control Transmission Protocol (SCTP) connection.

In Example 14, the subject matter of Examples 9-13 includes, wherein providing the connection to the second virtual machine comprises: providing an Address Configuration Change Chunk (ASCONF) instructing the remote device to end the data connection and to connect to the second virtual machine.

In Example 15, the subject matter of Examples 9-14 includes, wherein the request to access the specified service comprises an address of the first virtual machine.

Example 16 is a method comprising: receiving, from a remote device, a request to access a specified service, the specified service being associated with a plurality of virtual machines, each of the plurality of virtual machines storing shared states associated with the specified service; providing, to the remote device in response to the request, a connection to a first virtual machine of the plurality of virtual machines and identifiers of other ones of the plurality of virtual machines, the identifiers being provided for storage in conjunction with a Stream Control Transmission Protocol (SCTP) association; determining to end a data connection between the remote device and the first virtual machine while continuing to provide the specified service to the remote device via a second virtual machine; and providing, to the remote device in response to determining to disconnect the remote device from the first virtual machine, a connection to the second virtual machine of the plurality of virtual machines.

In Example 17, the subject matter of Example 16 includes, wherein determining to end the data connection is in response to a load balancing that includes the first virtual machine.

In Example 18, the subject matter of Examples 16-17 includes, wherein determining to end the data connection is in response to a failure of the first virtual machine.

In Example 19, the subject matter of Examples 16-18 includes, wherein the identifiers of the other ones of the plurality of virtual machines cause the remote device to receive heartbeats from the other ones of the plurality of virtual machines.

In Example 20, the subject matter of Examples 16-19 includes, wherein the connection to the first virtual machine comprises a Stream Control Transmission Protocol (SCTP) connection.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 5:
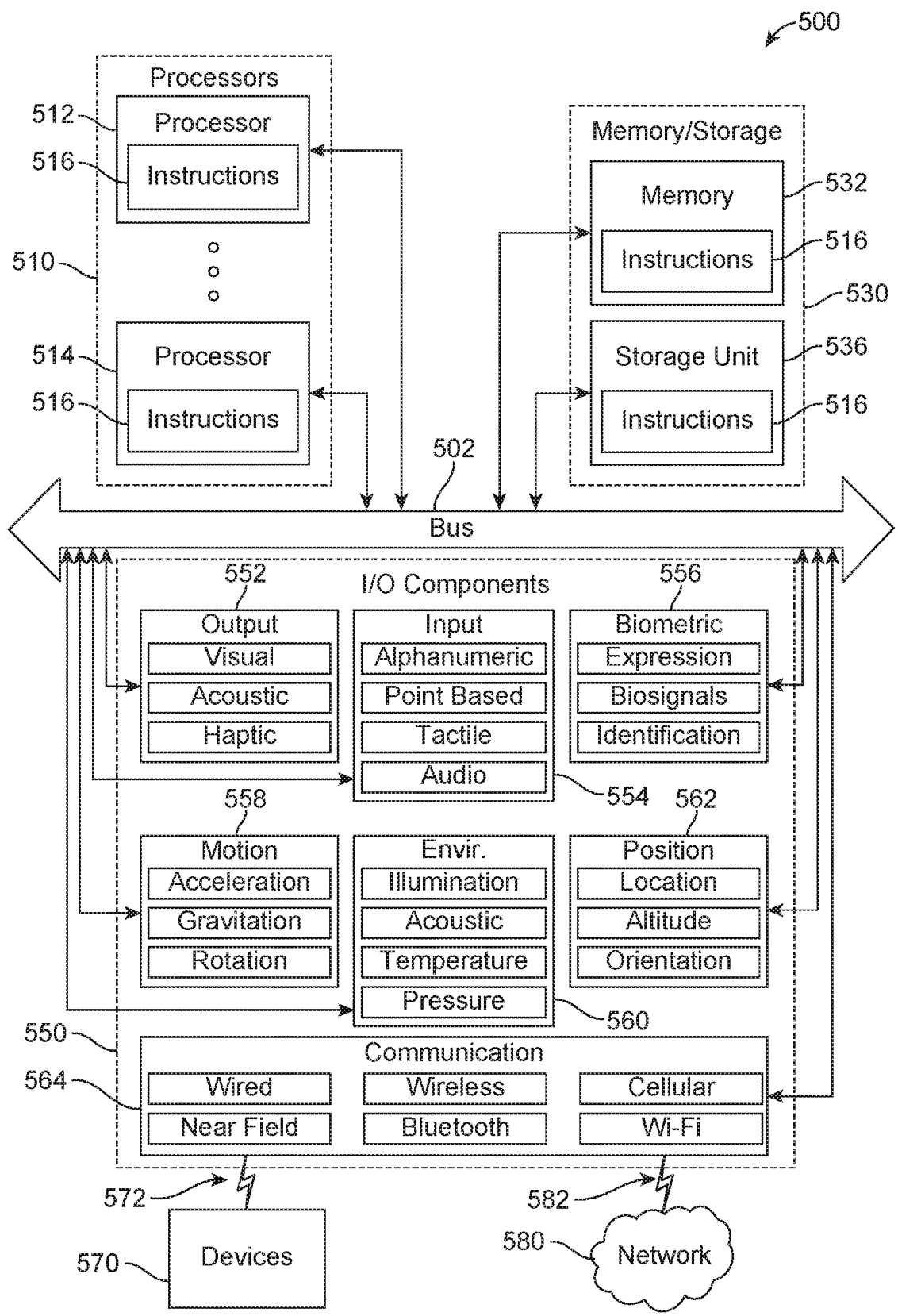
FIG. 5 is a block diagram illustrating components of a machine able to read instructions from a machine-readable medium and perform any of the methodologies discussed herein, in accordance with some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. The instructions 516 transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components, or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

In various example embodiments, one or more portions of the network 580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

What is claimed is:

1. A system comprising:
   processing circuitry; and
   a memory storing instructions which, when executed by the processing circuitry, cause the processing circuitry to perform operations comprising:
   receiving, from a remote device, a request to access a specified service, the specified service being associated with a plurality of virtual machines configured to perform the specified service and to store shared states associated with the specified service;
   providing, to the remote device in response to the request, a connection to a first virtual machine of the plurality of virtual machines;
   providing, to the remote device in response to the request, identifiers of other ones of the plurality of virtual machines, the identifiers being provided for storage in conjunction with a Stream Control Transmission Protocol (SCTP) association;
   determining to end the connection between the remote device and the first virtual machine while continuing to provide the specified service to the remote device via a second virtual machine; and
   providing, to the remote device in response to determining to end the connection, a connection to the second virtual machine of the plurality of virtual machines.

2. The system of claim 1, wherein determining to end the connection is in response to a load balancing that includes the first virtual machine.

3. The system of claim 1, wherein determining to end the connection is in response to a failure of the first virtual machine, and further comprises sending a command to remove the identifier of the first virtual machine and to store the address of the second virtual machine as the connection such that the remote device disconnects from the first virtual machine and connects to the second virtual machine to continue to provide the specified service to the remote device.

4. The system of claim 1, wherein the operations further comprise the other ones of the plurality of virtual machines corresponding to the identifiers sending heartbeats to the remote device.

5. The system of claim 1, wherein the connection to the first virtual machine comprises a Stream Control Transmission Protocol (SCTP) connection.

6. The system of claim 1, wherein providing the connection to the second virtual machine comprises:
   providing an Address Configuration Change Chunk (AS-CONF) instructing the remote device to end the connection to the first virtual machine and to connect to the second virtual machine.

7. The system of claim 1, wherein the request to access the specified service comprises an address of the first virtual machine.

8. The system of claim 1, wherein the remote device comprises a client device.

9. A non-transitory machine-readable medium storing instructions which, when executed by processing circuitry of one or more machines, cause the processing circuitry to perform operations comprising:
   receiving, from a remote device, a request to access a specified service, the specified service being associated with a plurality of virtual machines configured to perform the specified service and to store shared states associated with the specified service;
   providing, to the remote device in response to the request, a connection to a first virtual machine of the plurality of virtual machines;
   providing, to the remote device in response to the request, identifiers of other ones of the plurality of virtual machines, the identifiers being provided for storage in conjunction with a Stream Control Transmission Protocol (SCTP) association;
   determining to end the connection between the remote device and the first virtual machine while continuing to provide the specified service to the remote device via a second virtual machine; and
   providing, to the remote device in response to determining to end the connection the remote device from the first virtual machine, a connection to the second virtual machine of the plurality of virtual machines.

10. The machine-readable medium of claim 9, wherein determining to end the connection is in response to a load balancing that includes the first virtual machine.

11. The machine-readable medium of claim 9, wherein determining to end the connection is in response to a failure of the first virtual machine.

12. The machine-readable medium of claim 9, wherein the operations further comprise the other ones of the plurality of virtual machines corresponding to the identifiers sending heartbeats to the remote device.

13. The machine-readable medium of claim 9, wherein the connection to the first virtual machine comprises a Stream Control Transmission Protocol (SCTP) connection.

14. The machine-readable medium of claim 9, wherein providing the connection to the second virtual machine comprises:
   providing an Address Configuration Change Chunk (AS-CONF) instructing the remote device to end the connection to the first virtual machine and to connect to the second virtual machine.

15. The machine-readable medium of claim 9, wherein the request to access the specified service comprises an address of the first virtual machine.

16. A method comprising:
   receiving, from a remote device, a request to access a specified service, the specified service being associated with a plurality of virtual machines configured to perform the specified service and to store shared states associated with the specified service;
   providing, to the remote device in response to the request, a connection to a first virtual machine of the plurality of virtual machines;
   providing, to the remote device in response to the request, identifiers of other ones of the plurality of virtual machines, the identifiers being provided for storage in conjunction with a Stream Control Transmission Protocol (SCTP) association;

determining to end the connection between the remote device and the first virtual machine while continuing to provide the specified service to the remote device via a second virtual machine; and providing, to the remote device in response to determining to disconnect the remote device from the first virtual machine, a connection to the second virtual machine of the plurality of virtual machines.

17. The method of claim 16, wherein determining to end the connection is in response to a load balancing that includes the first virtual machine.

18. The method of claim 16, wherein determining to end the connection is in response to a failure of the first virtual machine.

19. The method of claim 16, further comprising the other ones of the plurality of virtual machines corresponding to the identifiers sending heartbeats to the remote device.

20. The method of claim 16, wherein the connection to the first virtual machine comprises a Stream Control Transmission Protocol (SCTP) connection.

* * * * *